(12) United States Patent
Misaki (10) Patent No.: US 9,703,265 B2
(45) Date of Patent: Jul. 11, 2017

(54) MEASUREMENT APPARATUS AND MEASUREMENT METHOD

(71) Applicant: ANRITSU CORPORATION, Kanagawa (JP)

(72) Inventor: Yuji Misaki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 1130 days.

(21) Appl. No.: 13/763,818

(22) Filed: Feb. 11, 2013

(65) Prior Publication Data

US 2013/0211781 A1 Aug. 15, 2013

(30) Foreign Application Priority Data

Feb. 13, 2012 (JP) ................. 2012-028492

(51) Int. Cl.
*G04F 3/00* (2006.01)
*G06F 15/00* (2006.01)
*H04B 17/309* (2015.01)
*H04B 17/10* (2015.01)

(52) U.S. Cl.
CPC ............ *G04F 3/00* (2013.01); *G06F 15/00* (2013.01); *H04B 17/309* (2015.01); *H04B 17/101* (2015.01)

(58) Field of Classification Search
CPC .......... G04F 3/00; H04B 17/309; G06F 15/00
USPC ......................................... 702/176
See application file for complete search history.

(56) References Cited

U.S. PATENT DOCUMENTS

2013/0136028 A1\* 5/2013 Gan ...................... H04W 24/02
370/252

FOREIGN PATENT DOCUMENTS

JP 2007-104294 A 4/2007

\* cited by examiner

*Primary Examiner* — Ricky Ngon
(74) *Attorney, Agent, or Firm* — Pearne & Gordon LLP (57) ABSTRACT

To provide a measurement apparatus and measurement method capable of shortening the measurement time, a measurement apparatus 10 includes: an acquisition section 21 that acquires the data of a plurality of slots; a setting unit 12 that sets measurement items for each slot; an additional time table 23 that stores additional time set in advance for each measurement item; a measurement period setting section 22 that sets a measurement period for measuring the data of a slot by adding additional time before and after time assigned to the slot; and a measurement section 30 that measures the characteristics of the data of the slot in a measurement period.

11 Claims, 7 Drawing Sheets

| MEASUREMENT ITEMS | WCDMA (0.667ms/slot) | LTE (1.0ms/subframe) |
|---|---|---|
| Power | 0.01 ms | 0.01 ms |
| EVM | 0.02 ms | 0.05 ms |
| OBW | 0.01 ms | 0.02 ms |
| SEM | 0.01 ms | 0.02 ms |
| ACLR | 0.02 ms | 0.05 ms |

MEASUREMENT APPARATUS AND MEASUREMENT METHOD

TECHNICAL FIELD

The present invention relates to a measurement apparatus and measurement method for measuring the output signal of a mobile terminal, such as a mobile phone.

BACKGROUND ART

As this type of apparatus in the related art, a modulated signal analyzer disclosed in Patent Document 1 is known.

The modulated signal analyzer disclosed in Patent Document 1 includes: a signal analysis unit that analyzes a modulated signal for each time slot (hereinafter, simply referred to as a "slot"); an abnormality determination unit that determines the abnormality of the analysis result; a cause investigation sequence memory that stores a plurality of measurement items (signal power, modulation accuracy, and the like) for a modulated signal, which are to be applied to investigate the cause of abnormality when it is determined that the analysis result is abnormal, and the cause investigation sequence showing the execution order of the abnormality determination of the analysis result; an abnormality cause investigation unit that investigates the cause of abnormality according to the cause investigation sequence; and a display unit that displays each analysis result, the determination result, and the cause of abnormality.

Through this configuration, the modulated signal analyzer disclosed in Patent Document 1 can automatically perform abnormality determination regarding the analysis results of signal power, modulation accuracy, and the like, and can also investigate the cause of abnormality automatically.

RELATED ART DOCUMENT

Patent Document

[Patent Document 1] JP-A-2007-104294

Disclosure of the Invention

However, in the modulated signal analyzer disclosed in Patent Document 1, when measuring signal power, modulation accuracy, and the like, a predetermined measurement period, for which safety has been taken into consideration, is set as a measurement period for measuring the data of each slot regardless of measurement items. For this reason, there has been a problem in that it is not possible to shorten the measurement time. Explanation will be given specifically with reference to FIG. 10.

Figure 10:
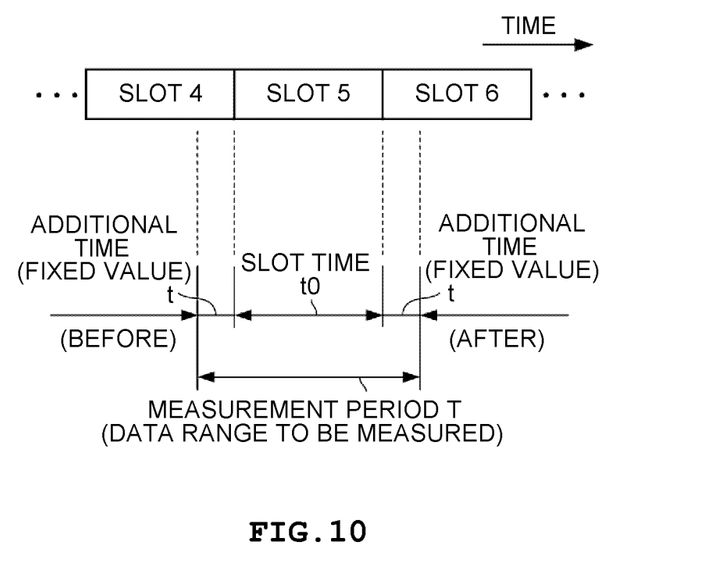
FIG. 10 is an explanatory view of the setting of a measurement period by a measurement apparatus in the related art.

FIG. 10 shows slots 4 to 6 which are included in a certain frame signal and are consecutive in time series. Data period t0 of each slot is set for each communication method. For example, in the communication method of WCDMA (Wideband-Code Division Multiple Access), data period t0 of each slot is t0=0.667 ms.

In a known measurement apparatus, when measuring the signal power, modulation accuracy, and the like for the data of the slot 5 shown in FIG. 10, a measurement period T (=t0+2t) is set by adding additional time t before and after the data period t0 of the slot 5 in consideration of the rising time and falling time of a signal in the slot, the number of samples required for the filtering process, and the like. Here, the optimal value of the additional time t changes with the measurement item or the communication method. However, in the known measurement apparatus, the additional time t of the fixed value, which is to give a relatively large margin (time margin) so as to be able to meet various measurement items or communication methods, has been adopted. For this reason, in the known measurement apparatus, there has been a problem in that the measurement period T for each slot becomes relatively long and accordingly it is not possible to shorten the measurement time.

The present invention has been made in order to solve the problem in the related art, and it is an object of the present invention to provide a measurement apparatus and measurement method that can shorten the measurement time.

Problem that the Invention is to Solve

A measurement apparatus according to claim 1 of the present invention is a measurement apparatus (10) that, in order to receive a frame signal from a terminal to be tested (40) and measure characteristics of time-division data included in the frame signal, has measurement item setting means (12) for setting measurement items for each item of the time-division data, time-division data acquisition means (21) for acquiring the time-division data, and time-division data measurement means (30) for measuring the characteristics of the time-division data in a measurement period. The measurement apparatus includes: additional time storage means (23) for storing additional time (t1), which is set in advance, for each of the measurement items; and measurement period setting means (22) for setting the measurement period (T1, T2) for measuring the time-division data by adding the additional time before and after data period (t0, t2) assigned to the time-division data.

Through this configuration, in the measurement apparatus according to claim 1 of the present invention, a measurement period to measure the time-division data is set by adding additional time, which is set in advance for each measurement item, before and after the data period assigned to time-division data. Therefore, unlike the related art, it is possible to set an appropriate measurement period without a relatively large margin. As a result, it is possible to shorten the measurement time.

A measurement apparatus according to claim 2 of the present invention has a configuration in which the terminal to be tested is able to communicate according to a plurality of communication methods, the additional time storage means stores the additional time for each of the communication methods, and the measurement period setting means sets the measurement period for each of the communication methods.

Through this configuration, the measurement apparatus according to claim 2 of the present invention can shorten the measurement time by setting the measurement period for each communication method even when a terminal to be tested, which can communicate according to a plurality of communication methods, is set as an object to be measured.

A measurement apparatus according to claim 3 or 4 of the present invention has a configuration in which the time-division data acquisition means acquires the time-division data sequentially and consecutively.

Through this configuration, the measurement apparatus according to claim 3 or 4 of the present invention can acquire the time-division data sequentially and consecutively and measure the acquired data in a relatively short time.

A measurement apparatus according to any one of claims 5 to 8 of the present invention has a configuration in which the time-division data measurement means includes a plurality of measurement sections (31, 32) that measure the characteristics in parallel with processing of the time-division data acquisition means to acquire the time-division data.

Through this configuration, the measurement apparatus according to any one of claims 5 to 8 of the present invention performs the acquisition and measurement of time-division data in parallel. Therefore, it is possible to shorten the measurement time.

A measurement apparatus according to claim 9 of the present invention has a configuration in which the time-division data measurement means further includes a measurement allocation section (33) that assigns processing for measuring the characteristics to each of the measurement sections.

Through this configuration, in the measurement apparatus according to claim 9 of the present invention, the measurement allocation section assigns measurement processing. Therefore, since each measurement section can perform measurement efficiently, it is possible to shorten the measurement time.

A measurement method according to claim 10 of the present invention is a measurement method that, in order to receive a frame signal from a terminal to be tested (40) and measure characteristics of time-division data included in the frame signal, has a measurement item setting step (S11) of setting measurement items for each item of the time-division data, a time-division data acquisition step (S13) of acquiring the time-division data, and a time-division data measurement step (S16) of measuring the characteristics of the time-division data in a measurement period. The measurement method includes: a measurement period setting step (S15) of setting the measurement period (T1, T2) for measuring the time-division data by adding the additional time before and after data period (t0, t2), which is assigned to the time-division data, on the basis of an additional time table (23) that stores additional time (t1) set in advance for each of the measurement items.

Through this configuration, in the measurement method according to claim 10 of the present invention, a measurement period to measure the time-division data is set by adding additional time, which is set in advance for each measurement item, before and after the data period assigned to time-division data. Therefore, unlike the related art, it is possible to set an appropriate measurement period without a relatively large margin. As a result, it is possible to shorten the measurement time.

In a measurement method according to claim 11 of the present invention, the terminal to be tested is able to communicate according to a plurality of communication methods, the additional time table stores the additional time for each of the communication methods, and the measurement period is set for each of the communication methods in the measurement period setting step.

Through this configuration, in the measurement method according to claim 11 of the present invention, it is possible to shorten the measurement time by setting the measurement period for each communication method even when a terminal to be tested, which can communicate according to a plurality of communication methods, is set as an object to be measured.

Advantage of the Invention

According to the present invention, it is possible to provide a measurement apparatus and measurement method advantageous in that the measurement time can be shortened.

BEST MODE FOR CARRYING OUT THE INVENTION

Hereinafter, embodiments of the present invention will be described with reference to the accompanying drawings.

Figure 1:
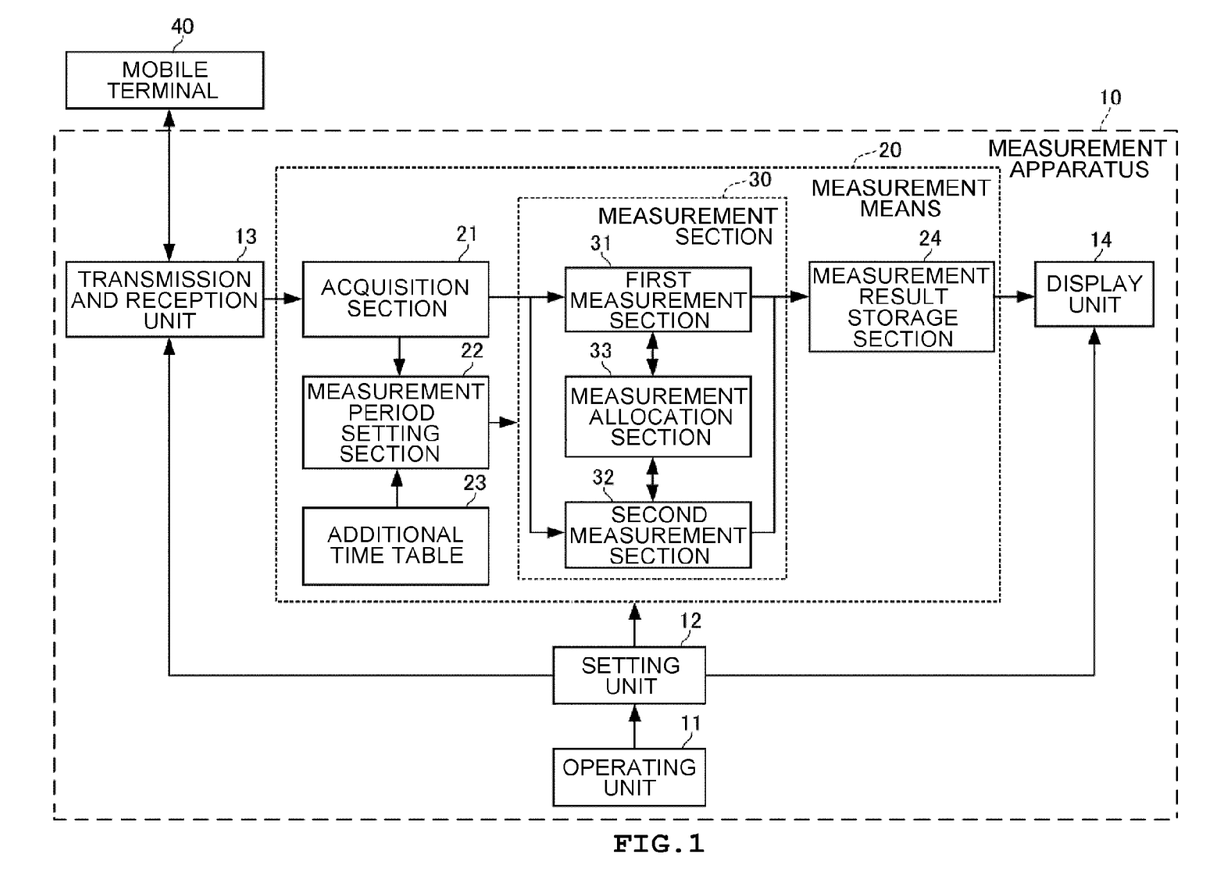
FIG. 1 is a block diagram showing the configuration of a measurement apparatus according to an embodiment of the present invention.

As shown in FIG. 1, a measurement apparatus 10 according to the present embodiment measures an output signal of a mobile terminal 40 as a terminal to be tested. The mobile terminal 40 is based on one or more communication methods.

Examples of the communication methods include not only the above-described WCDMA but also GSM (registered trademark; Global System for Mobile Communications), LTE (Long Term Evolution), CDMA2000 (Code Division Multiple Access 2000), EVDO (Evolution Data Only), TDSCDMA (Time Division Synchronous Code Division Multiple Access), and wireless LAN (Local Area Network) based on Wi-Fi (registered trademark) standards.

The measurement apparatus 10 includes an operating unit 11, a setting unit 12, a transmission and reception unit 13, a display unit 14, and measurement means 20.

A tester operates the operating unit 11 in order to input the measurement conditions in the measurement of the mobile terminal 40 or to set the display content of the display unit 14. For example, the operating unit 11 is configured to include an input device such as a keyboard, a dial, or a mouse, a display that displays the measurement conditions and the like, and a control circuit or software that controls these.

The setting unit 12 sets the measurement conditions and the like, which have been input by the tester through the operating unit 11, in the transmission and reception unit 13 or the display unit 14. The setting unit 12 forms measurement item setting means according to the present invention.

The transmission and reception unit 13 is connected to the mobile terminal 40, for example, through a coaxial cable so as to communicate with the mobile terminal 40.

Specifically, the transmission and reception unit 13 includes a transmission circuit and a receiving circuit. The transmission circuit includes a DA (Digital to Analog) converter, an amplifier, a filter, a frequency-variable local oscillator, an up-converter, a transmission antenna, and the like. The receiving circuit includes an AD (Analog to Digital) converter, a filter, an amplifier, a down converter, a frequency-variable local oscillator, a receiving antenna, and the like.

Through this configuration, the transmission and reception unit 13 can convert a digital signal input from the setting unit 12 into an RF (radio frequency) signal of a predetermined frequency band and transmit the RF signal to the mobile terminal 40. In addition, the transmission and reception unit 13 can receive an RF signal of a predetermined frequency band from the mobile terminal 40, convert the RF signal into a digital signal, and output the digital signal to the measurement means 20.

The measurement means 20 includes an acquisition section 21, a measurement period setting section 22, an additional time table 23, a measurement section 30, and a measurement result storage section 24. The measurement section 30 includes a first measurement section 31, a second measurement section 32, and a measurement allocation section 33. In addition, the measurement section 30 forms time-division data measurement means according to the present invention. In addition, the first and second measurement sections 31 and 32 form a plurality of measurement sections according to the present invention.

Figure 2:
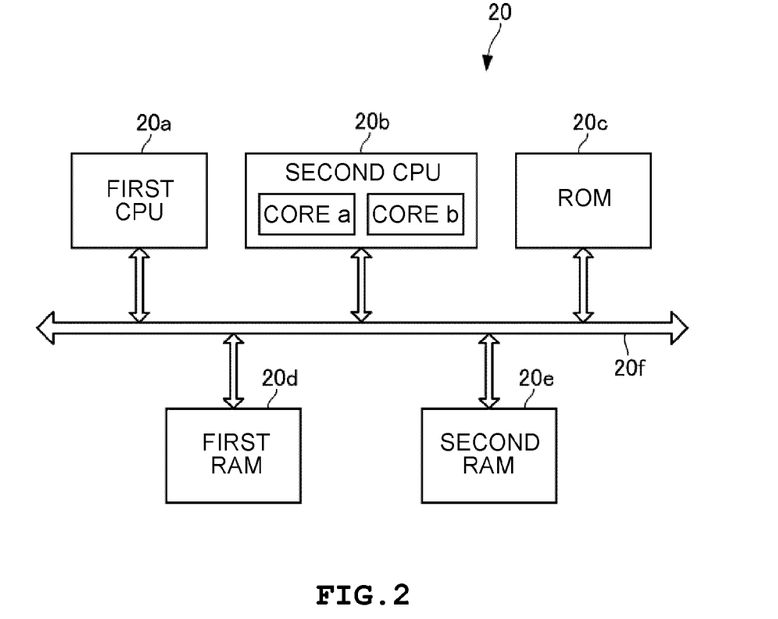
FIG. 2 is a diagram showing the hardware configuration of measurement means in the measurement apparatus according to the embodiment of the present invention.

Here, the hardware configuration of the measurement means 20 is shown in FIG. 2. As shown in FIG. 2, the measurement means 20 is configured to include a first CPU 20a, a second CPU 20b, a ROM 20c, a first RAM 20d, and a second RAM 20e that are connected to a bus 20f.

The first CPU 20a controls the overall operation of the measurement means 20 according to the program stored in the ROM 20c.

The second CPU 20b is a dual-core CPU having cores a and b. The cores a and b form the first and second measurement sections 31 and 32, respectively. The second CPU 20b performs measurement according to the program stored in the ROM 20c.

The ROM 20c stores program codes processed by the first and second CPUs 20a and CPU 20b, and also functions as the additional time table 23.

The first RAM 20d acquires a frame signal from the transmission and reception unit 13 and stores it. That is, the first RAM 20d forms the acquisition section 21.

The second RAM 20e receives and stores the data of measurement results. That is, the second RAM 20e forms the measurement result storage section 24.

Referring back to FIG. 1, a function of each configuration will be described.

The acquisition section 21 receives the frame signal that the transmission and reception unit 13 has received from the mobile terminal 40, acquires time-division data included in the frame signal sequentially, and stores the time-division data. The acquisition section 21 can acquire signals of several tens of frames, for example. In addition, the acquisition section 21 forms time-division data acquisition means according to the present invention.

The measurement period setting section 22 sets a measurement period by reading the data of additional time corresponding to the measurement item from the additional time table 23 and adding the additional time to the data period assigned to the time-division data. The measurement period setting section 22 forms measurement period setting means according to the present invention.

The additional time table 23 stores the data of additional time set in advance by experiments, simulation, and the like, as a table, for each communication method. The additional time table 23 forms the additional time storage means according to the present invention.

The measurement result storage section 24 stores the data of the measurement result of the measurement section 30.

The display unit 14 is configured to include a liquid crystal display, for example, and reads the data of the measurement result stored in the measurement result storage section 24 and displays it.

Next, data of additional time stored in the additional time table 23 will be described with reference to FIG. 3.

Figure 3:
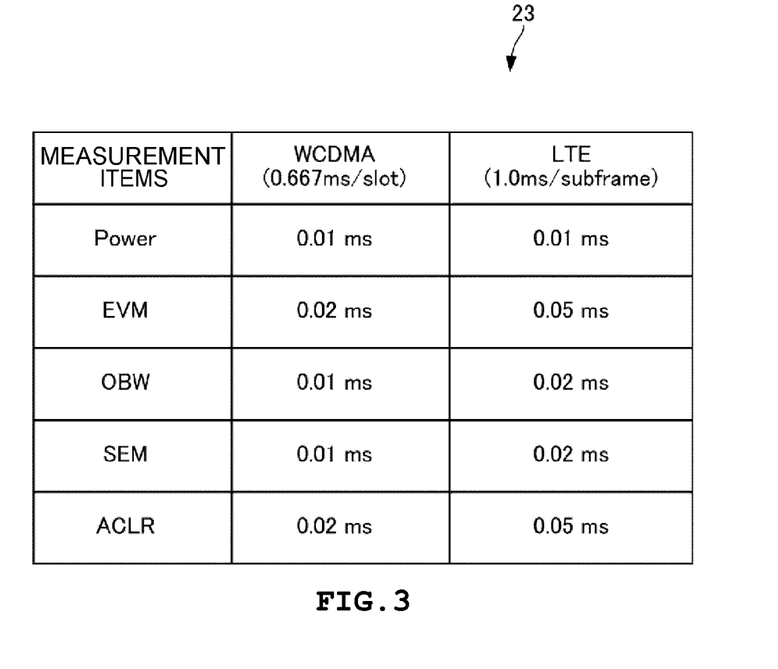
FIG. 3 is a diagram showing an example of an additional time table in the measurement apparatus according to the embodiment of the present invention.

The additional time table 23 shown in FIG. 3 includes the data of additional time in the case of the communication method of WCDMA and the data of additional time in the case of the communication method of LTE. As measurement items, signal power (Power), modulation accuracy (EVM), occupied bandwidth (OBW), spurious emission mask (SEM), and adjacent channel leakage power ratio (ACLR) are illustrated.

First, in the communication method of WCDMA, one frame time is 10 ms, and 15 time-division slots are included in one frame. That is, one slot time is 0.667 ms. For this one slot time, for example, in the measurement of EVM, 0.02 ms is set as additional time in the additional time table 23 in the present embodiment. When measuring the EVM in the communication method of WCDMA, the measurement period setting section 22 adds additional time of 0.02 ms as shown in FIG. 4.

Figure 4:
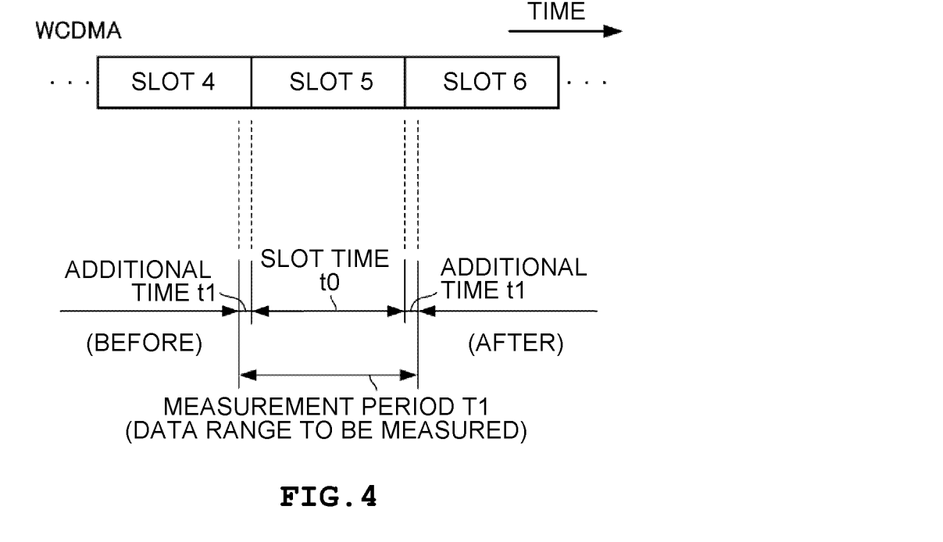
FIG. 4 is an explanatory diagram of the setting of a measurement period for a slot in the measurement apparatus according to the embodiment of the present invention.

That is, as shown in FIG. 4, in the EVM measurement of the communication method of WCDMA, the measurement period setting section 22 sets a period (0.707 ms), which is obtained by adding additional time t1 of 0.02 ms before and after data period t0 (0.667 ms) for each slot, as a measurement period T1. Here, the data of the slot in the communication method of WCDMA is an example of time-division data according to the present invention.

In addition, in FIG. 4, the slot 5 of consecutive slots 4, 5, and 6 has been described. However, for a first slot of a certain frame, the measurement period setting section 22 sets a measurement period by adding additional time before and after data period assigned to the slot.

Next, in the communication method of LTE, the time of one frame is 10 ms, and 20 time-division slots are included in one frame. In this communication method of LTE, two slots may be treated as one subframe, and the time of one subframe is 1.0 ms. For this time of one subframe, for example, in the measurement of ACLR, 0.05 ms is set as additional time in the additional time table 23 (refer to FIG. 3) in the present embodiment. When measuring the ACLR in the communication method of LTE, the measurement period setting section 22 adds additional time of 0.05 ms as shown in FIG. 5.

Figure 5:
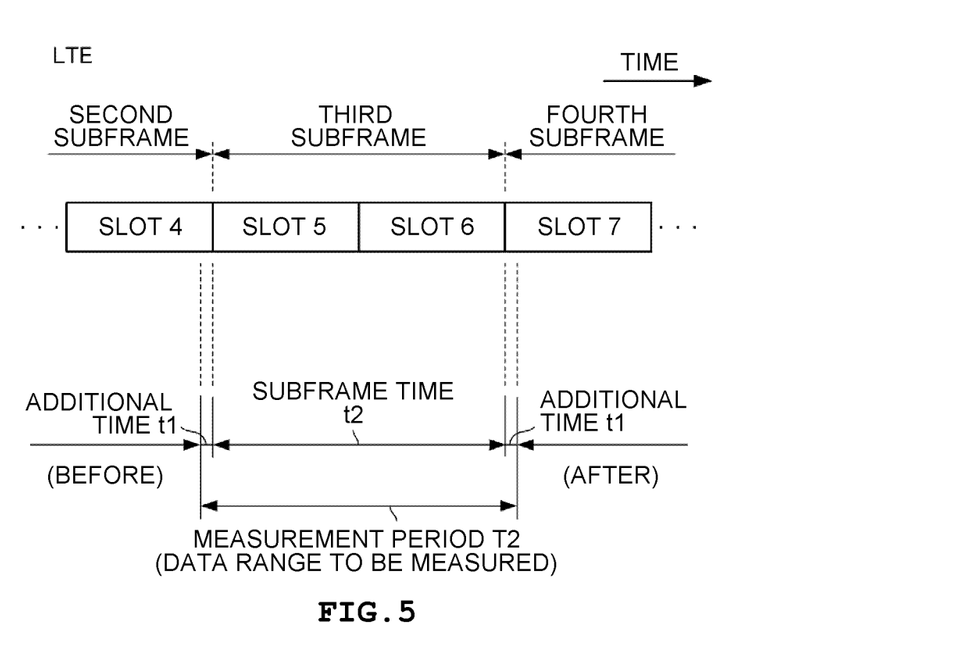
FIG. 5 is an explanatory diagram of the setting of a measurement period for a subframe in the measurement apparatus according to the embodiment of the present invention.

That is, as shown in FIG. 5, in the ACLR measurement of the communication method of LTE, the measurement period setting section 22 sets a period (1.1 ms), which is obtained by adding additional time t1 of 0.05 ms before and after data period t0 (1.0 ms) of each subframe, as a measurement period T2. In addition, the data of the subframe in the communication method of LTE is an example of time-division data according to the present invention. In addition, also in the communication method of LTE, it may be possible to adopt a configuration in which additional time is calculated in advance for each slot and added, as shown in FIG. 4.

In addition, the measurement period setting section 22 adopts the larger additional time when performing measurement regarding a plurality of measurement items. For example, in the communication method of LTE, when measuring the signal power (additional time 0.01 ms) and the EVM (additional time 0.05 ms), the measurement period setting section 22 adopts the additional time 0.05 ms of the EVM to set the measurement period.

The additional time table 23 sets a communication method and additional time appropriately for each measurement item by experiments, simulation, and the like. Accordingly, the measurement period setting section 22 can set an appropriate measurement period according to the communication method and the measurement item.

Referring back to FIG. 1, the configuration of the measurement section 30 will be described.

The first and second measurement sections 31 and 32 measure the data acquired by the acquisition section 21 on the basis of the allocation instruction of the measurement allocation section 33.

The measurement allocation section 33 monitors the processing load of the first and second measurement sections 31 and 32, and assigns measurement processing.

The operation of the measurement section 30 will be described on the basis of a schematic diagram shown in FIG. 6.

Figure 6:
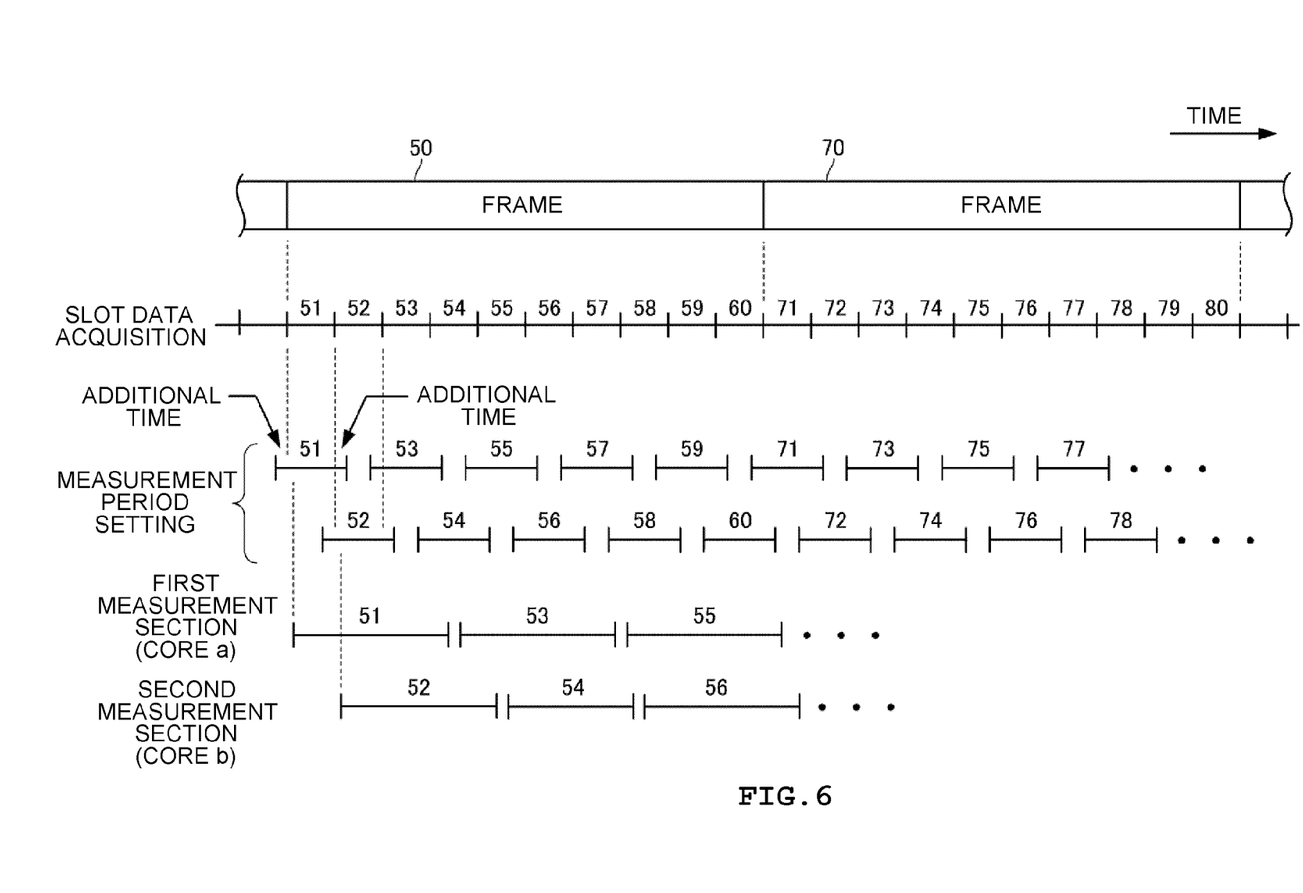
FIG. 6 is an explanatory diagram of the operation of measurement means in the measurement apparatus according to the embodiment of the present invention.

In the upper part of FIG. 6, a situation is shown in which the acquisition section 21 consecutively acquires the data of slots included in consecutive frames 50 and 70 in time series. The frame 50 includes slots 51 to 60, and the frame 70 includes slots 71 to 80.

In the middle part of FIG. 6, a measurement period set by the measurement period setting section 22 is shown. As described above, the measurement period setting section 22 adds additional time before and after the time of each slot.

In the lower part of FIG. 6, a situation is shown in which the first and second measurement sections 31 and 32 measure the data of slots assigned by the measurement allocation section 33 in parallel. For example, the first measurement section 31 starts measurement after a predetermined time has passed from the start of the acquisition of the slot 51, and the second measurement section 32 starts measurement after a predetermined time has passed from the start of the acquisition of the slot 52.

As described above, the measurement allocation section 33 monitors the processing load of the first and second measurement sections 31 and 32 and assigns measurement processing. In the example shown in FIG. 6, however, since the measurement time of the first and second measurement sections 31 and 32 is the same (load of measurement processing is the same), the measurement allocation section 33 assigns the measurement processing alternately to the first and second measurement sections 31 and 32.

On the other hand, when the measurement processing of one of the first and second measurement sections 31 and 32 ends, the measurement allocation section 33 assigns new measurement processing to the measurement section that has ended the measurement processing.

Figure 7:
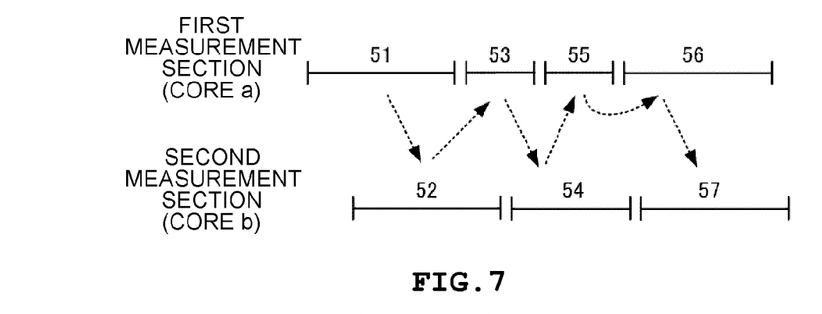
FIG. 7 is an explanatory diagram of allocation of a measurement allocation section in the measurement apparatus according to the embodiment of the present invention.

For example, as shown in FIG. 7, when the slots 51 to 57 are objects to be measured, the measurement allocation section 33 assigns the measurement processing of the slots 51 to 55 alternately to the first and second measurement sections 31 and 32. Here, the first measurement section 31 ends the measurement of the slot 55 before the second measurement section 32 ends the measurement of the slot 54. In this case, the measurement allocation section 33 assigns the measurement of the slot 56, which is the next slot, to the first measurement section 31, thereby assigning the measurement of the slot 57 when the second measurement section 32 has ended the measurement of the slot 54.

Through the above-described configuration, in the measurement apparatus 10, the first and second measurement sections 31 and 32 can measure the data of slots in parallel while the acquisition section 21 acquires the data of slots. Therefore, it is possible to shorten the measurement time.

Figure 8:
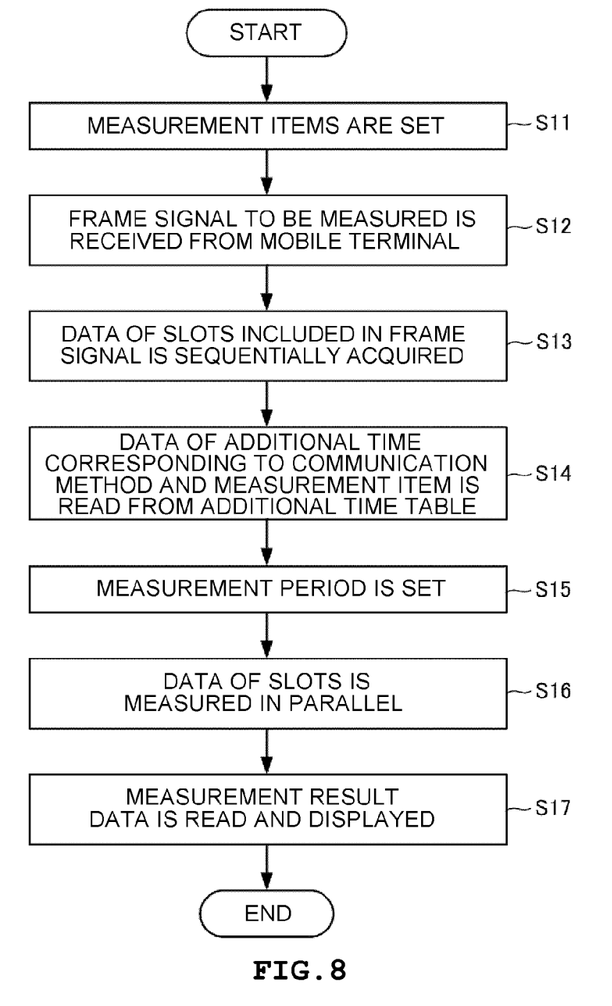
FIG. 8 is a flow chart showing the operation of the measurement apparatus according to the embodiment of the present invention.

Next, the operation of the measurement apparatus 10 according to the present embodiment will be described using the flow chart shown in FIG. 8 while appropriately referring to the block diagram shown in FIG. 1.

The setting unit 12 sets the measurement item by outputting the information of the measurement item, which the tester has input by operating the operating unit 11, to the transmission and reception unit 13 and the measurement means 20 (step S11). Examples of the measurement item include designation of one or more communication methods, designation of a frame and a slot to be measured, signal power, and modulation accuracy.

The transmission and reception unit 13 communicates with the mobile terminal 40 to receive a frame signal to be measured from the mobile terminal 40 (step S12), and converts the received frame signal into a predetermined intermediate frequency signal using a down converter and then performs AD conversion and outputs the result to the measurement means 20.

The acquisition section 21 of the measurement means 20 acquires the data of slots included in the frame signal sequentially and consecutively, as shown in the upper part of FIG. 6 (step S13).

The measurement period setting section 22 reads the data of additional time, which corresponds to the communication method and the measurement item set by the setting unit 12, from the additional time table 23 (step S14) and sets a measurement period by adding the additional time before and after data period assigned to the slot (step S15), thereby setting the data range to be measured.

The first and second measurement sections 31 and 32 measure the data of the slots, which has been acquired by the acquisition section 21, in parallel in the measurement period on the basis of the allocation of the measurement allocation section 33 (step S16), and output the measurement result data to the measurement result storage section 24.

The display unit 14 reads the measurement result data from the measurement result storage section 24 and displays the measurement result data (step S17).

Next, another aspect of the measurement of the measurement means 20 will be described with reference to FIG. 9.

In the above explanation, as shown in FIG. 6, measurement for the slots included in consecutive frames has been illustrated. However, it is also possible to extract arbitrary frames from the frame sequence and measure them as shown in FIG. 9. This instruction to extract a frame is given when the setting unit 12 outputs the information of a frame to be extracted to the measurement means 20 after the tester operates the operating unit 11 to set the frame to be extracted.

Figure 9:
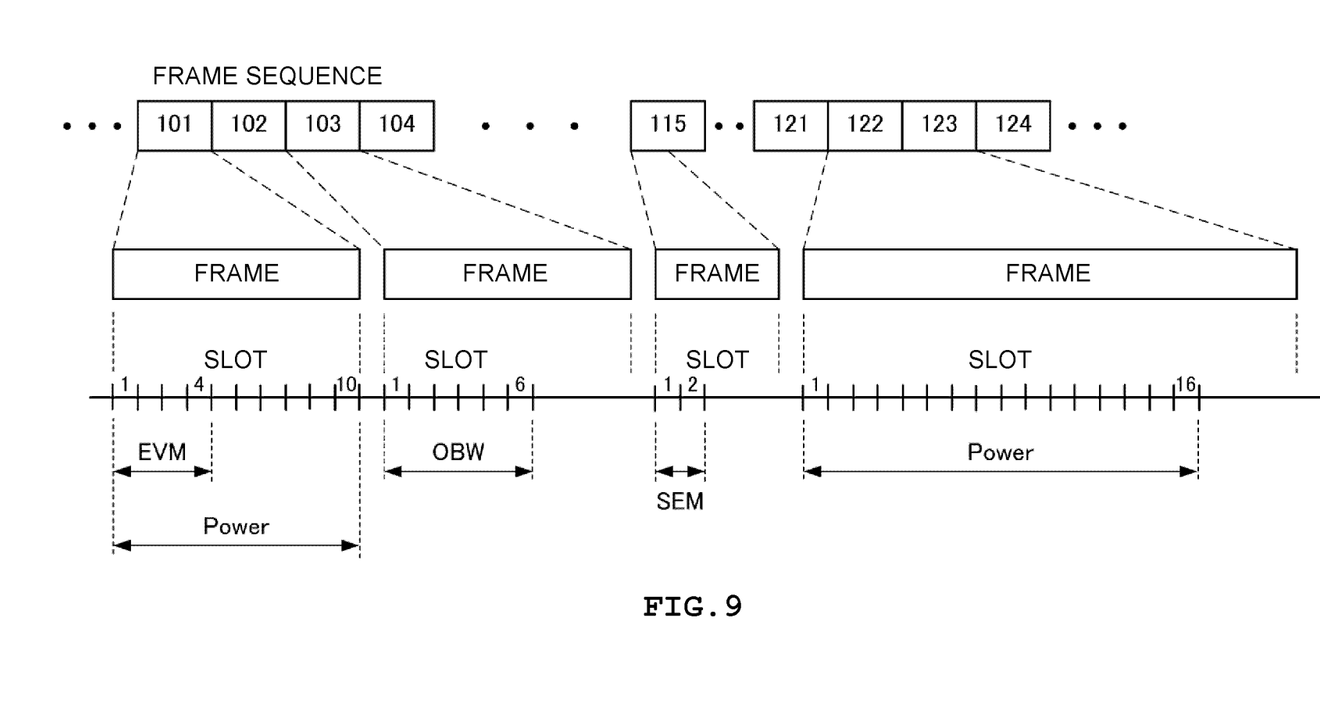
FIG. 9 is an explanatory diagram of another aspect of slot data measurement in the measurement apparatus according to the embodiment of the present invention.

FIG. 9 shows a frame sequence of consecutive frames. In FIG. 9, a situation is shown in which frames 101, 103, 115, 122, and 123 are extracted from the frame sequence and the acquisition section 21 acquires slots to be measured that are included in each frame.

As shown in FIG. 9, the modulation accuracy (EVM) is to be measured for slots 1 to 4 of the frame 101, and signal power (Power) is to be measured for slots 1 to 10 of the frame 101. In addition, in the frame 103, the occupied bandwidth (OBW) is to be measured for slots 1 to 6 of 10 slots.

In addition, in the frame 115, a frame signal of a half frame is acquired, and the spurious emission mask (SEM) is to be measured for slots 1 and 2.

In addition, two frames of frames 122 and 123 are consecutively acquired by the acquisition section 21, and the signal power (Power) is to be measured for slots 1 to 16 of total 20 slots.

As described above, the measurement means 20 may also extract an arbitrary frame from the sequence of consecutive frames and measure the data of arbitrary slots, which are included in the extracted frame, for a predetermined measurement item.

As described above, the measurement apparatus 10 according to the present embodiment has a configuration in which a measurement period to measure the time-division data is set by adding additional time before and after data period assigned to time-division data, such as a slot or a subframe. Therefore, unlike the related art, it is possible to set an appropriate measurement period without a relatively large margin. As a result, it is possible to shorten the measurement time.

In addition, although an example where two measurement sections are formed using a dual-core CPU has been described in the above embodiment, the present invention is not limited thereto. For example, a measurement apparatus including three or more measurement sections may be formed using a CPU having three or more cores. Using this measurement apparatus, it is possible to further shorten the measurement time.

As described above, the measurement apparatus and measurement method according to the present invention are advantageous in that measurement time can be shortened. Therefore, the measurement apparatus and measurement method according to the present invention are useful as a measurement apparatus and measurement method for measuring the output signal of a mobile terminal, such as a mobile phone.

DESCRIPTION OF REFERENCE NUMERALS AND SIGNS

10: measurement apparatus
11: operating unit
12: setting unit (measurement item setting means)
14: display unit
20: measurement means
20a: first CPU
20b: second CPU
20c: ROM
20d: first RAM
20e: second RAM
20f: bus
21: acquisition section (time-division data acquisition means)
22: measurement period setting section (measurement period setting means)
23: additional time table (additional time storage means)
24: measurement result storage section
30: measurement section (time-division data measurement means)
31: first measurement section (a plurality of measurement sections)
32: second measurement section (a plurality of measurement sections)
33: measurement allocation section
40: mobile terminal (terminal to be tested)

The invention claimed is:

1. A measurement apparatus for receiving a frame signal from a terminal to be tested and measuring characteristics of time-division data included in the frame signal, the apparatus comprising:
   measurement item setting means for setting measurement items for each item of the time-division data;
   additional time storage means for storing additional time, which is set in advance, for each of the measurement items; and
   measurement period setting means for setting a measurement period for measuring the time-division data by adding the additional time before and after a data period assigned to the time-division data;
   time-division data acquisition means for acquiring the time-division data during the measurement period;
   time-division data measurement means for measuring the characteristics of the time-division data during the measurement period,
   wherein the time-division data is acquired and the characteristics of the time division data are measured in parallel during the measurement period.

2. The measurement apparatus according to claim 1, wherein
   the terminal to be tested is able to communicate according to a plurality of communication methods,
   the additional time storage means stores the additional time for each of the communication methods, and
   the measurement period setting means sets the measurement period for each of the communication methods.

3. The measurement apparatus according to claim 2, wherein the time-division data acquisition means acquires the time-division data sequentially and consecutively.

4. The measurement apparatus according to claim 3, wherein the time-division data measurement means includes a plurality of measurement sections that measure the characteristics in parallel with processing of the time-division data acquisition means to acquire the time-division data.

5. The measurement apparatus according to claim 2, wherein the time-division data measurement means includes a plurality of measurement sections that measure the characteristics in parallel with processing of the time-division data acquisition means to acquire the time-division data.

6. The measurement apparatus according to claim 1, wherein the time-division data acquisition means acquires the time-division data sequentially and consecutively.

7. The measurement apparatus according to claim 6, wherein the time-division data measurement means includes a plurality of measurement sections that measure the characteristics in parallel with processing of the time-division data acquisition means to acquire the time-division data.

8. The measurement apparatus according to claim 1, wherein the time-division data measurement means includes a plurality of measurement sections that measure the characteristics in parallel with processing of the time-division data acquisition means to acquire the time-division data.

9. The measurement apparatus according to claim 8, wherein the time-division data measurement means further includes a measurement allocation section that assigns processing for measuring the characteristics to each of the measurement sections.

10. A measurement method for receiving a frame signal from a terminal to be tested and measuring characteristics of time-division data included in the frame signal, the method comprising:
   setting measurement items for each item of the time-division data;
   setting a measurement period for measuring the time-division data by adding the additional time before and after a data period, which is assigned to the time-division data, on the basis of an additional time table that stores additional time set in advance for each of the measurement items; and
   in parallel during the measurement period, acquiring the time-division data and measuring the characteristics of the time-division data.

11. The measurement method according to claim 10, wherein
   the terminal to be tested is able to communicate according to a plurality of communication methods,
   the additional time table stores the additional time for each of the communication methods, and
   the measurement period is set for each of the communication methods.

* * * * *